(12) United States Patent
Johnson (10) Patent No.: US 6,651,165 B1
(45) Date of Patent: Nov. 18, 2003

(54) METHOD AND APPARATUS FOR DIRECTLY BOOTING A RAID VOLUME AS THE PRIMARY OPERATING SYSTEM MEMORY

(75) Inventor: Harold L. Johnson, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 585 days.

(21) Appl. No.: 09/711,498

(22) Filed: Nov. 13, 2000

(51) Int. Cl.[7] .............................................. G06F 9/445
(52) U.S. Cl. ......................................................... 713/2
(58) Field of Search .......................... 713/1, 2; 709/222

(56) References Cited

U.S. PATENT DOCUMENTS 6,098,119 A * 8/2000 Surugucchi et al. .......... 710/10
6,529,989 B1 * 3/2003 Bashford et al. ........... 710/306
6,567,911 B1 * 5/2003 Mahmoud ...................... 713/2

* cited by examiner

*Primary Examiner*—Thomas M. Heckler
(74) *Attorney, Agent, or Firm*—John R. Ley, L.L.C.

(57) ABSTRACT

A computer system operating system (OS) is booted from a storage media formed from a redundant array of independent disks (RAID). An interface adapter is connected to a system bus, and the interface adapter includes a nonvolatile option ROM memory which has RAID I/O algorithmic instructions recorded therein. When a basic input output system (BIOS) is executed during booting, a BIOS hardware detect instruction set of the BIOS scans the system bus and causes the RAID I/O algorithmic instructions to be read from the option ROM memory for use by a BIOS I/O instruction set, and the BIOS I/O instruction set uses the RAID I/O algorithmic instructions obtained from the option ROM memory to read the OS from the RAID storage media.

30 Claims, 4 Drawing Sheets

METHOD AND APPARATUS FOR DIRECTLY BOOTING A RAID VOLUME AS THE PRIMARY OPERATING SYSTEM MEMORY

This invention relates to computer systems and methods which involve data storage and memory media organized into a redundant array of independent disks (RAID). More particularly, the present invention relates to a new and improved method and apparatus for directly booting or establishing functionality of the computer operating system (OS) with a RAID storage media volume as the primary OS memory, rather than a single disk or storage device, without requiring the use of a dedicated RAID controller. As a result of the RAID volume being the primary OS memory, system performance is substantially enhanced by the OS having the capability to directly send and receive large numbers of input output operations (I/Os) to the RAID volume without encountering the delay and complexity of converting single memory device I/Os into RAID I/Os. Greater reliability is also achieved by storing the OS on the RAID volume.

BACKGROUND OF THE INVENTION

One type of data storage and memory media which is well known and used in many modern computer systems is a redundant array of independent disks (RAID). RAID media use a plurality of separate disk drives which are connected in a group or array, rather than a single disk drive or storage media. RAID systems offer numerous advantages, particularly in high-performance computer systems which require high data throughput performance and high reliability against the accidental loss of data.

To achieve higher data throughput, the RAID volume is formed by distributing or striping the data across a number of the RAID disk drives to form a data volume. A data volume is the collection of physical storage spaces or capacity which is reserved on a multiplicity of the RAID disk drives in which a single integral collection of data is distributed. This type of RAID volume is referred to as "RAID 0." By distributing the data volume throughout a number of disk drives in the array, input/output operations (I/Os) to multiple disk drives can be performed approximately simultaneously. The time to perform I/Os constitutes a substantial restriction in computer performance, so by performing the I/Os simultaneously on all of the disk drives, the time consumed for the I/Os to access and retrieve the data is substantially reduced. The performance of the computer system is substantially increased in terms of throughput of information.

Reliability against accidental data failures is achieved in a type of RAID media known as "RAID 1." Any disk drive is susceptible to failure and a possible loss of the data and information recorded on it. However, in a RAID 1 configuration, identical copies of the same data and information are recorded on different disk drives. The multiple disk drives which receive the identical copies of the data are referred to as "mirrored." The failure of one of the mirrored disks does not prevent access to the data because the other mirrored disk drive is probably functional and available for I/Os without any significant loss of performance or downtime in computer functionality.

RAID media may also make use of combinations of both RAID 0 and RAID 1 to achieve both high-performance and redundancy. Such combinations are known as "RAID 0+1," "RAID 1+0" or "RAID 10." Moreover, parity codes which allow the reconstruction of lost data are also typically used in RAID media as a further assurance against accidental destruction of data resulting from causes not involving the failure of disk drives. Because of both performance enhancements and gains in reliability against the unintended loss of data, RAID media offer substantial improvements in computer systems.

Despite the advantages of RAID storage media compared to single storage media, most computer software operating systems (OSs) have been written to interact with a single storage media as the primary OS memory media. This fact is primarily a historical artifact of the earlier and more primitive OS architectures which were originally developed for earlier versions of personal computers. However, because of the large number of personal computer systems in use, because contemporary personal computers offer great computing capacity for relatively low cost, and because contemporary personal computers are being used more predominantly in high-capacity business computing applications, attempting to change the OS from the basic original single storage media architecture would cause enormous problems of backward compatibility for use with earlier versions of personal computers. Indeed, none of the contemporary personal computers are believed to offer the capability of the OS interacting directly with a RAID media as the primary OS memory.

Instead, to use RAID media with contemporary computers, it has been necessary to interpose RAID controllers between the RAID media and the computer system to perform RAID algorithms between the conventional, single storage media I/Os generated by the conventional OS and the multiple different I/Os which are involved in communicating with the multiple disk drives of the RAID storage media. Such RAID controllers are dedicated, single purpose devices whose sole function is to perform these RAID algorithms. In addition, certain types of hardware adapters have been used as RAID controllers by programming the hardware adapters to perform the RAID algorithms. Because of the similarity in dedicated, sole purpose functionality, both the dedicated RAID controllers and the hardware adapters which have been programmed to perform only the RAID algorithms are referred to herein as RAID controllers.

RAID controllers hide the physical properties of the RAID volume from the OS. The OS performs I/O instructions as though a single memory media or disk drive was the mass storage element for the computer system. The RAID controller prevents the OS from directly interacting with the physical properties of the RAID volume. While RAID controllers are effective, they add complexity and cost to a high-performance computer system. The complexity arises because the RAID volume I/O processing is off-loaded from the OS to the RAID controller, and because of the conversion required between I/Os generated by a conventional, single storage media OS and the I/Os delivered to and received from the RAID storage media. The conversions create additional possibilities for malfunction, failure and diminished performance of the computer system. The cost of a dedicated RAID controller or a RAID hardware adapter increases the cost of the computer system, because the cost of these items is generally considerably higher than the cost of more generic components use for a variety of different purposes in a computer system.

In response to the cost and complexity of RAID controllers, RAID emulation software programs have been written which directly interact with the conventional, single storage media I/Os generated by the OS and convert those instructions into I/Os suitable for interaction with the RAID volume. Such RAID emulation software programs are effective, but they must rely on the operation of the conventional single storage media OS as a basis for their own functionality in implementing the RAID algorithms. The conventional single storage media OS must be booted and fully operative before the RAID emulation program can be loaded and used.

These previous RAID controller and emulation techniques have made it costly, complex, impossible or difficult to distribute the OS on the RAID volume and to boot the OS from the RAID volume. Consequently, the benefits of redundancy and reliability against accidental data loss offered by RAID storage systems has not generally been available to the OS. Furthermore, in order to use the previous RAID controllers or RAID emulation software programs, it was necessary to have the conventional OS operating, and operation of the conventional OS meant that a single storage media was the primary OS memory. Consequently, the operation of the OS with its primary OS memory as a single storage media could not be interrupted to replace the primary OS memory with a RAID volume. It was impossible to directly boot an OS using a RAID volume as the primary OS storage media without using a hardware-based RAID subsystem, because the conventional OS had to be running in order to load such software, but once the conventional single storage media OS was loaded and operative, it was impossible to replace its single storage media OS functionality. This dilemma has therefore previously resulted in no known OS for a contemporary personal computer which boots from and utilizes a RAID volume as the primary OS memory.

These and other background considerations have led to and resulted in the present invention.

SUMMARY OF THE INVENTION

One feature of the present invention is the ability to directly load and utilize a RAID volume as the primary operating system (OS) media in a computer system not having a dedicated RAID controller. This aspect of the invention comes about as a result of accessing and using RAID algorithmic instructions obtained from an option ROM memory of an adapter interface (preferably a non-RAID specific adapter interface, such as a small computer standard interface (SCSI) adapter) connected to the computer system, during an initial power up stage of the computer system. The RAID algorithmic instructions read from the option ROM memory bootstrap or boot additional RAID algorithmic instructions read from the RAID storage media to make the RAID volume the primary OS storage media. As a result, the performance of the computer system is greatly enhanced by the ability of the OS to issue and receive multiple input/output operations (I/Os) directly with respect to the RAID volume without the necessity for conversion of single storage media I/Os into RAID I/Os by a RAID controller.

Another feature of the invention relates to the capability of directly loading or booting a RAID-media-based OS which has previously been recorded on and distributed over the disk drives or storage media of a RAID volume, without first booting or loading the OS to recognize a single storage media as the primary OS storage media. This aspect of the invention allows the RAID-based OS to be distributed over the RAID storage media in a high-performance computer system. As a result, the computer system achieves relatively high reliability against accidental failure or data loss of the OS.

In accordance with these features, one aspect of the present invention relates to a method of booting an operating system (OS) recorded in a RAID storage media in a computer system. A computer system has a processor, a nonvolatile system memory and an interface adapter connected to a bus. The interface adapter includes a nonvolatile option ROM memory and his preferably a non-RAID specific adapter such as a SCSI adapter. The interface adapter is connected to the RAID storage media, preferably by an adapter bus. The nonvolatile system memory stores basic input output system (BIOS) instructions including a BIOS bus scan or hardware detect instruction set and a BIOS input output (I/O) instruction set. The method involves recording RAID I/O algorithmic instructions in the option ROM memory, executing the BIOS hardware detect instruction set to read the RAID I/O algorithmic instructions recorded in the option ROM memory, executing the BIOS I/O instruction set utilizing the RAID I/O algorithmic instructions to read the OS from the RAID storage media. In this manner, the RAID I/O algorithmic instructions are directly loaded for use in subsequent OS I/O operations, without the need for RAID controllers. Moreover, the RAID storage media becomes the primary OS storage media, and the OS may be loaded from the RAID storage media as a part of the boot process.

Other preferable aspects of the present invention involve recording the OS on a plurality of independent storage devices which are configured in a RAID 1, RAID 0 or a RAID 10 storage media configuration. By recording the OS on multiple disks of a RAID storage media configuration, it is possible to take advantage of the redundancy and higher I/O bandwidth for purposes of data reliability and speed of booting for the OS. In addition, it is possible to replace or supersede the RAID I/O algorithmic instructions with replacement RAID driver I/O algorithmic instructions which are recorded in the RAID storage media as a part of booting the OS and thereafter using the replacement RAID driver I/O algorithmic instructions in executing OS I/O operations. Such replacement RAID driver I/O algorithmic instructions may include more extensive RAID error handling instructions than the initial RAID I/O algorithmic instructions recorded in the option ROM memory. Preferably and in addition to the RAID I/O algorithmic instructions, the option ROM memory also includes a BIOS I/O service instruction set which allows the BIOS I/O instruction set to use the RAID I/O algorithmic instructions, hardware instructions which allow the RAID I/O algorithmic instructions to interact with the interface adapter to perform I/O operations to the RAID storage media, initialization code which when executed initializes the interface adapter and validates an operative status of the storage devices. Thereafter the initialization code is deleted from the system memory after the interface adapter has been initialized and the operative status of the storage devices has been validated.

The present invention also relates to a method of directly establishing and executing OS I/O instructions with a RAID storage media in an OS of a computer system which includes a nonvolatile memory and a BIOS recorded in the nonvolatile memory. The method includes recording RAID I/O algorithmic instructions in the nonvolatile memory for use by the OS in performing OS I/O operations on the RAID storage media, reading the RAID I/O algorithmic instructions from the nonvolatile memory for use by the OS while executing the BIOS during booting, and using the RAID I/O algorithmic instructions at least initially to execute OS I/O operations after the OS has booted.

Further, the present invention relates to improvements in a computer system having a processor, a nonvolatile system memory and an interface adapter which are all connected to a system bus. The computer system further includes a plurality of independent storage devices in a RAID configuration connected to the interface adapter, and the interface adapter includes a nonvolatile option ROM memory. The system memory contains code defining a BIOS having a BIOS bus scan or hardware detect instruction set and a BIOS I/O instruction set. The OS is recorded in a RAID configuration on the RAID storage media. RAID I/O algorithmic instructions are recorded in the option ROM memory in a configuration which causes the BIOS hardware detect instruction set to read the RAID I/O algorithmic instructions from the option ROM memory and record the RAID I/O algorithmic instructions in the system memory. The RAID I/O algorithmic instructions execute in conjunction with the BIOS I/O instruction set to read the OS recorded on the RAID storage media during booting of the OS.

A more complete appreciation of the numerous features, aspects and improvements of the present invention, as well as the scope of the present invention and the manner in which it achieves the above noted improvements, can be obtained by reference to the following detailed description of a presently preferred embodiment of the invention taken in connection with the accompanying drawings, which are briefly summarized below, and the appended claims.

DETAILED DESCRIPTION

Figure 1:
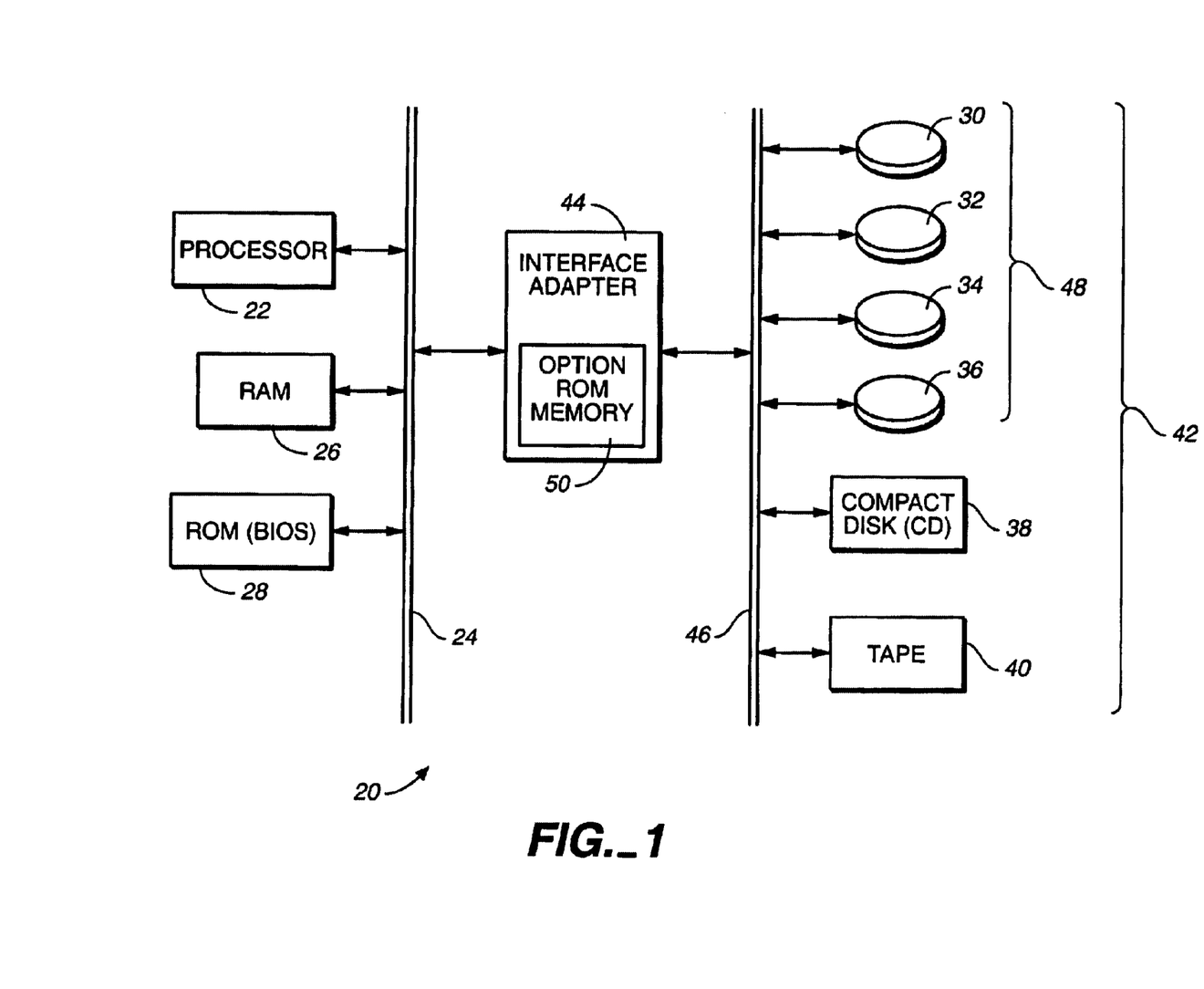
FIG. 1 is a generalized block diagram of a computer system utilizing a RAID volume as the primary operating system (OS) storage media, within which the present invention is incorporated.

One example of a computer system 20 which incorporates the present invention in shown in FIG. 1. The computer system 20 includes one or more conventional central processing units (CPUs) or processors 22 which are connected to a conventional system bus 24, such as a conventional peripheral component interconnect (PCI) bus. Also connected to the system bus 24 are a conventional random access memory (RAM) 26 and a conventional read-only memory (ROM) 28. The operating code defining the basic input output system (BIOS) for the computer system 20 is recorded in a nonvolatile state in the ROM 28 for use by the computer system 20. Other conventional computer devices, such as input/output (I/O) devices, keyboards, pointers, printers, monitors, modems, network adapters, and the like (none of which are specifically shown), are also typically connected to the system bus 24.

Data storage or the devices 30, 32, 34, 36, 38 and 40, for example, form a mass data storage media 42 for storing and allowing access to the operating system (OS) code, application programs, user data, and other information. An interface adapter 44 connects the storage devices 30, 32, 34, 36, 38 and 40 to the system bus 24. The storage devices 30, 32, 34, 36, 38 and 40 are connected to an adapter bus 46, and the adapter bus is connected to the interface adapter 44. The interface adapter 44 preferably takes the form of a conventional small computer standard interface (SCSI) adapter, although other types of non RAID-specific adapters which have an option ROM memory may be used with the present invention. The adapter bus 46 preferably takes the form of a conventional SCSI bus, although other types of adapter buses may be used with the present invention.

As is typical, signals are communicated back and forth between the components 22, 26, 28 and 44 over the system bus 24, and the interface adapter 44 communicates signals back and forth over the adapter bus 46 between the storage media components 30, 32, 34, 36 and 38 to achieve functionality of the computer system 20.

Some of the devices of the mass storage media 42 form a conventional RAID storage system or volume 48. The RAID volume 48 is formed by a group or an array of a plurality of the conventional, independent disk drives 30, 32, 34 and 36. The interface adapter 44 interacts with and controls the disk drives 30, 32, 34 and 36 in addition to performing its other typical adapter interfacing functions. Consequently, the RAID volume 48 is defined by the disk drives 30, 32, 34 and 36 and the interface adapter functionality of the interface adapter 44. More or less disk drives than those shown at 30, 32, 34 and 36 may be utilized in the RAID volume 48 in accordance with the present invention.

In addition, the mass storage media 42 for the computer system 20 may also include other storage devices, such as a compact disc (CD) media 38 or tape media 40, for example. The other storage devices 38 and 40 are not part of the RAID volume 48. The interface adapter 44 also interacts with the CD media 38 and tape media 40 to control their operation in a conventional manner, the as well as interacting with the RAID volume 48.

It is typical that basic-function interface adapters 44, such as SCSI adapters, include an option ROM memory 50, which contains enough computer software code or instructions to load a larger set of operational code or instructions which cause the adapter 44 to perform its functions. Although not shown, it is also typical for the adapter 44 to include its own processor. The operational code or instructions from the option ROM memory 50 is also delivered to the computer system RAM 26 to interact with the computer system BIOS and allow the computer system BIOS to interact with the interface adapter 44 in performing I/Os to the devices connected to the interface adopter 44. The use of an option ROM in an interface adapter is conventional. However a nonconventional aspect of the present invention is that the option ROM memory 50 includes operational instructions and code 51 (FIG. 5) which allows the computer system OS to be loaded or booted from the RAID volume 48 and allows the RAID volume 48 to be the primary OS storage media, as is discussed in greater detail below.

Figure 2:
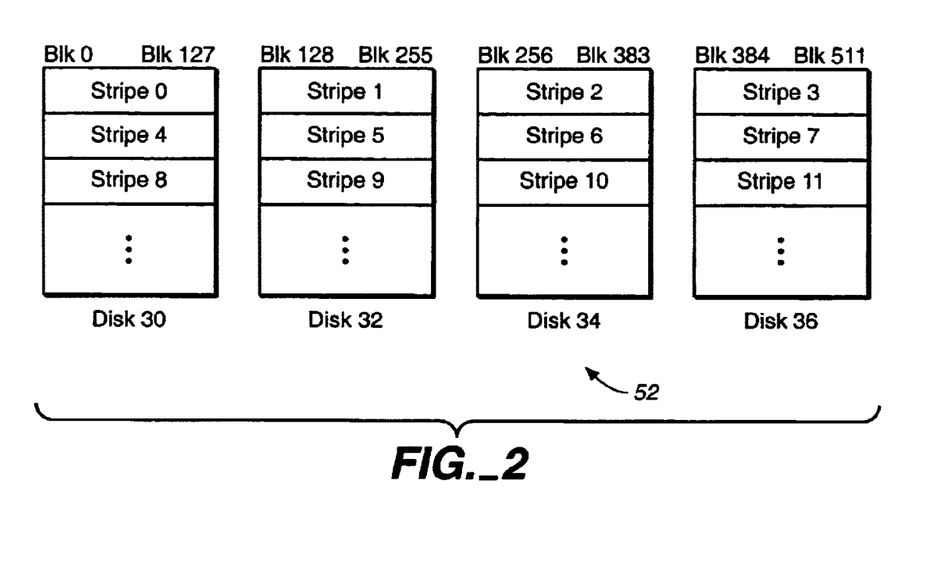
FIG. 2 is a diagrammatic representation of the organization of the RAID volume of the computer system shown in FIG. 1 into a RAID 0 configuration.

The RAID volume 48 may be organized into any of the conventional RAID configurations. For example, the RAID volume 48 may be organized into a RAID 0 configuration 52 shown in FIG. 2. As shown in FIG. 2, the disk drives 30, 32, 34 and 36 form a four column striped RAID volume 48. Data is stored on each disk drive in groups of blocks known as a stripe. The number of blocks in the stripe is called the stripe size. The frequently used stripe size is 128 blocks, and each block is typically 512 bytes in size (the standard sector size), resulting in each stripe being 64 KB in size. FIG. 2 also illustrates an exemplary assignment of stripe reference numbers. Data is distributed into the stripes on all four of the disk drives 30, 32, 34 and 36. To obtain the entire data for a file, for example, it may be necessary to perform I/Os to each of the four disk drives 30, 32, 34 and 36, since stripes on each of these four disk drives may contain part of the data for that particular file.

Figure 3:
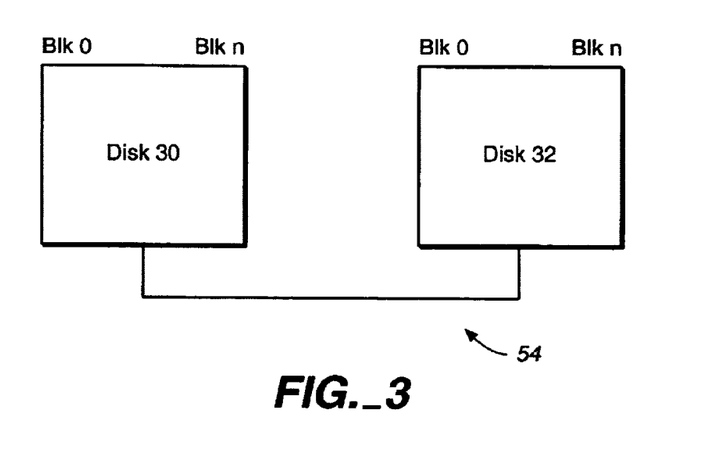
FIG. 3 is a diagrammatic representation of the organization of the RAID volume of the computer system shown in FIG. 1 into a RAID 1 configuration.

An exemplary RAID 1 configuration 54 formed by some of the disk drives 30 and 32 of the data volume 48 is shown in FIG. 3. In the situation shown in FIG. 3, the disk drive 32 is a mirror of the disk drive 30, in the sense that an exact same copy of the data stored on disk drive 30 is stored on disk drive 32. The same I/Os are performed to both of the disk drives 30 and 32 in order to maintain the mirrored relationship of the data. The other ones of the disk drives 34 and 36, for example, of the RAID volume 48 (FIG. 1), may also be mirrored.

Figure 4:
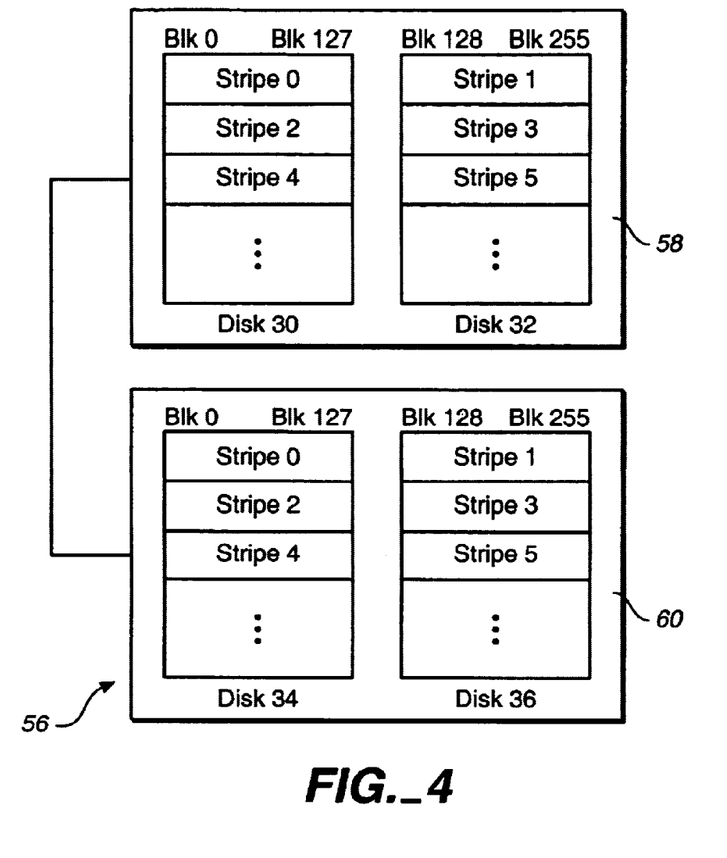
FIG. 4 is a diagrammatic representation of the organization of the RAID volume of the computer system shown in FIG. 1 into a RAID 0+1, 1+0 or 10 configuration.

An exemplary RAID 0+1, 1+0 or 10 configuration 56 is formed by the disk drives 30, 32, 34 and 36 and is shown in FIG. 4. This configuration 56 combines both of the features from the RAID 0 configuration 52 (FIG. 2) and the RAID 1 configuration 54 (FIG. 3). As shown in the RAID 10 configuration 56, disk drives 30 and 32 are striped in the manner of the RAID 0 configuration, and are organized into a group 58. Similarly, disk drives 34 and 36 are striped in the manner of the RAID 0 configuration, and they are organized into a separate group 60. The two groups 58 and 60 of the striped disk drives are mirrored, so that each group 58 and 60 contains an exact duplicate or mirror image of the data contained in the other group. I/Os are performed to each of the disk drives 30, 32, 34 and 36 of the RAID configuration 56, but the I/Os are organized so that the striped configuration of the groups 58 and 60 is maintained, and the duplication of the data between the groups 58 and 60 is also maintained.

In the case of the three RAID configurations 52, 54 and 56 shown in FIGS. 2, 3 and 4 respectively, RAID processing software is utilized to direct the I/Os to the appropriate disk drives in accordance with the type of RAID configuration, and to retrieve the data and information and combine it for use by the computer system 20 (FIG. 1). The RAID processing software is recorded on the mass storage media 42, preferably on the disk drives of the RAID volume 48, and is read into the computer system RAM 26 and used when the computer system 20 (FIG. 1) is fully functional. The present invention allows the RAID volume 48 to become the primary OS storage media of the computer system 20, and allows the RAID processing software to become the primary OS functionality for performing I/Os to the RAID volume 48 (FIG. 1).

In order to establish the RAID volume 48 and the RAID processing software as the basis for the operating system (OS) primary I/O functionality in the computer system 20 (FIG. 1), the OS must be booted or loaded to recognize the RAID volume 48 (FIG. 1) as the primary OS storage media, and to use RAID I/O algorithmic instructions from the RAID processing software to perform I/Os directly with the RAID volume 48. The present invention achieves such functionality from operational instructions or code contained in the option ROM memory 50 located in the interface adapter 44, as shown in FIG. 1, and from the booting or boot strapping process in which the RAID I/O algorithmic instructions are built up as part of the OS of the computer system 20.

All conventional computers of the personal-computer type execute a boot or bootstrap process which generally causes the OS to build up from some simple preliminary instructions or code until it reaches its fully operative configuration. The boot program is relatively short and is held in ROM or other nonvolatile memory. The function of the boot program is to load another larger program having more code or instructions than the original boot program. The instructions of the longer program thereafter load another even longer program with even more instructions, and the process continues until the entire OS is loaded and the computer system becomes functional.

The system BIOS (recorded in the ROM 28, FIG. 1) initiates the boot process by calling a conventional software interrupt code 19$h$ service of the BIOS. Interrupt 19$h$ is hereafter referred to as "interrupt 19." Interrupt 19 service uses another conventional BIOS interrupt code 13$h$ service which is used to load the beginning boot information from a known sector on a selected disk drive. Interrupt 13$h$ is hereafter referred to as "interrupt 13."

In general, the boot process involves a scan of the interface adapter devices connected to the system bus 24 (FIG. 1). The system BIOS has provisions to read and load code from the option ROM memory of each of the interface adapters connected to the system bus, if an option ROM is present in such adapters. As part of a scan of the adapters, the code from the option ROM memory is transferred to the system RAM for interaction with the system BIOS. It is at this time that the code from the option ROM memory 50 of the interface adapter 44 (FIG. 1) is read and transferred into the system RAM 26 (FIG. 1). The size of the code which may be handled by the system BIOS from the option ROM memory is limited, typically to approximately 64 kilobytes (KB) of code. This limitation is significant because the limited amount code must contain all the operational instructions necessary to control the functionality of the interface adapter device. In addition with respect to the present invention, the code from the option ROM memory 50 must also contain the RAID I/O algorithmic instructions to allow the RAID volume 48 to be accessed as a part of the boot process. The option ROM memory 50 of the present invention includes the code 51 (FIG. 5) which modifies the typical interrupt 13 service code to cause the computer system OS to be loaded or booted from the RAID volume 48, to cause the RAID volume 48 to be the primary OS storage media, and to invoke the RAID I/O algorithmic instructions of the RAID processing software for use by the OS.

Figure 5:
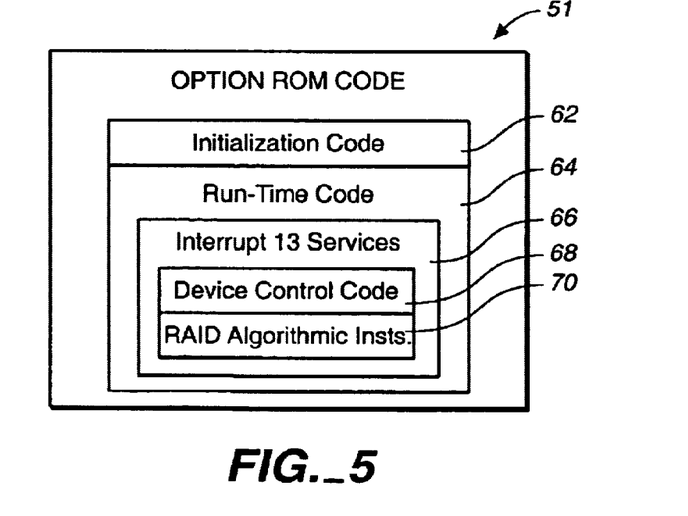
FIG. 5 is a diagrammatic representation of the code incorporated in an option read-only memory (ROM) of an adapter of the computer system shown in FIG. 1.

The code 51 contained in the option ROM memory 50 is categorized as shown in FIG. 5. The primary components of the code 51 of the option ROM memory are an initialization code 62 and a run-time code 64. In its preferred form, the initialization code 62 and the run-time code 64 are approximately 64 KBs in length, in total.

The initialization code 62 is responsible for initializing the functionality of the interface adapter 44 (FIG. 1), making the interface adapter 44 functional. The initialization code 62 is also responsible for setting up any "hooks" (data structures) used by the computer system BIOS to communicate information concerning the interface adapter. After the initialization code 62 of the option ROM code 51 has been executed, it is no longer used and the initialization code 62 is deleted from the system RAM after the interface adapter 44 has been initialized by executing the initialization code 62. In general, the initialization code 62 of the option ROM code 51 is conventional.

The run-time code 64 obtained from the option ROM code 51 remains in the system RAM 26 (FIG. 1) after the initialization code 62 has been deleted, and in its preferred form is approximately 16 KBs in length. Within the run-time code 64 there is interrupt 13 service code 66 to manage and execute interrupt 13 service calls from the system BIOS. After beginning the booting or loading process, the interrupt 13 service may be replaced or superseded by other, more extensive loading or booting code. In the case of a Windows (NT or 2000) OS, booting from the run-time code 64 ultimately results in replacing that run-time code with Windows drivers which thereafter take over the functionality for I/O services and complete the boot process. In the case of other system OSs, such as disk operating system (DOS), it is necessary to retain at least portions of the run-time code 64 (e.g. interrupt 13 service code 66) in order to perform system I/Os, because such other types of system OSs do not include their own drivers which assume responsibility for the system I/Os, but instead rely on the interrupt 13 service for doing so.

All I/Os are directed through an interrupt 13 service code 66, which is responsible for getting the I/O requests from the system OS or the ROM during phases of the booting process, or continually thereafter during the operation of the computer system if its OS does not include drivers which replace the booted interrupt 13 service. If an I/O is executed from an interrupt 13 service call, it will be processed through the interrupt 13 service code 66. The ultimate function of the interrupt 13 service is to satisfy the I/Os.

A subpart of the interrupt 13 service code 66 is code 68 that is specific to controlling the operation of the interface adapter device. The interrupt 13 service code 66 interacts with the device control code 68, and the device control code 68 controls the operation of the interface adapter. The device control code 68 also directs I/Os to the disk drives 30, 32, 34 and 36, and the other devices 38 and 40 connected to the adapter bus 46 (FIG. 1). The interrupt 13 service code 66 will also call into the device control code 68 to transfer the I/Os to the non-RAID devices 38 and 40 (FIG. 1) of the mass storage media.

In the case of RAID-directed I/Os, the I/O will be diverted to basic RAID I/O algorithmic instructions or code 70 which is also a part of the run-time code 64. The RAID algorithmic code 70 is conventional, and in its basic form with error handling code removed, consume relatively few instructions. These minimal amount of RAID I/O algorithmic instructions are loaded directly from the option ROM memory 50 into the system RAM 26 (FIG. 1) for use by the system BIOS during booting and operation of the OS.

In general, the RAID I/O algorithmic instructions or code 70 determine the identity of the RAID device or devices (30, 32, 34 and 36, FIG. 1) to which the I/O is directed, including specific stripes located on multiple RAID devices. An interrupt 13 handle is created for RAID volume 48, and that RAID volume handle does not correspond to any specific device 30, 32, 34 or 36 (FIG. 1). Instead, the RAID volume handle corresponds to a number of these devices. The RAID I/O algorithmic instructions 70 are responsible for managing the software construct of the RAID volume handle and its relationship to the number of individual devices, as well as directing the device control code 68 to issue the appropriate I/Os to the appropriate devices as determined by the RAID I/O algorithmic instructions 70. The RAID I/O algorithmic instructions also break down a single I/O into multiple I/Os, in the case of a striped volume. Once this processing under the RAID algorithm 70 has occurred, the RAID I/O algorithmic instructions interact with the device control code 68 (both of which are recorded in system RAM 26) to satisfy the RAID-based I/O requests.

Figure 6:
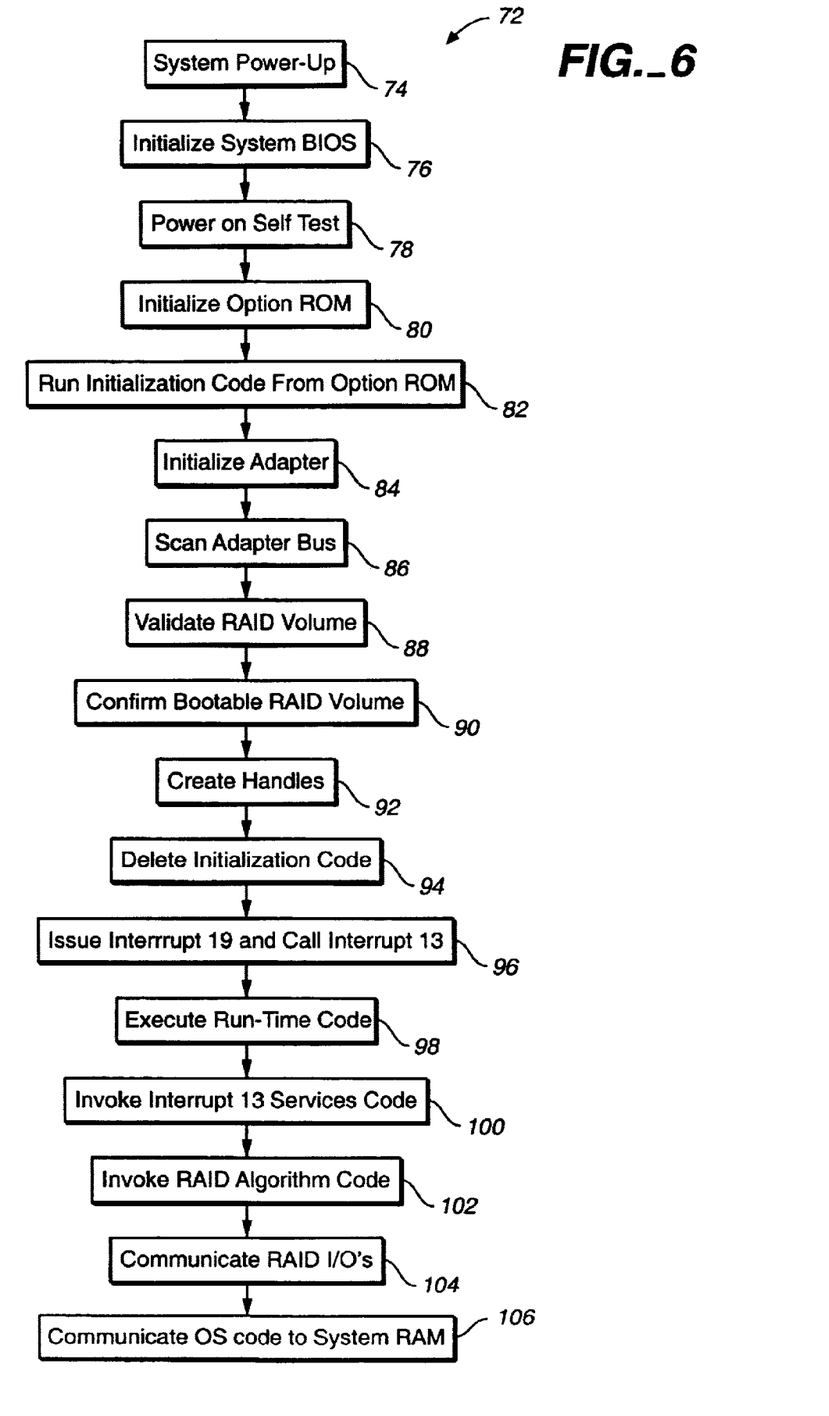
FIG. 6 is a flowchart of the steps involved in booting an operating system of the computer system shown in FIG. 1, in accordance with the present invention.

More details concerning the boot process of the present invention, which makes use of the code 51 (FIG. 5) of the option ROM memory 50 (FIG. 1), are understood from a process flow 72 shown in FIG. 6. In connection with the following description of FIG. 6, the non-process flow aspects of the computer system 20 are shown by the reference numbers in FIGS. 1, 4 and 5, unless otherwise specifically mentioned.

The boot process flow 72 begins at step 74, where the computer system 20 is powered up. The processor 22 starts at a certain location in the ROM 28, which is part of the system BIOS. The ROM 28 contains code which initiates the boot process.

As shown at step 76, the system BIOS is called and initialized. The system BIOS is responsible for managing all of the system hardware. In the case of a PCI bus being the system bus 24, the system BIOS is responsible for discovering all of the devices connected to the system bus, including the interface adapter 44.

A conventional power on self test commences, as shown at step 78. The system BIOS performs a scan to locate and identify all of the devices and interface adapters connected to the system bus 24. In addition to identifying all of the devices and interface adapters connected to the system bus, the system BIOS determines whether any of the interface adapters connected to the system bus have their own ROM which is typically referred to as the option ROM memory.

For each of the interface adapters connected to the system bus that have option ROMs, the system BIOS initializes those option ROM memories, as shown at step 80. In the case shown in FIG. 1, the option ROM memory 50 of the interface adapter 44 is initialized by the system BIOS. Initializing the option ROM memory 50 occurs by making a call to access the option ROM memory and to load the option ROM code 51 from the option ROM memory 50 into the system RAM 26. The option ROM code 51 is transferred to the RAM 26 in a location which is reserved for option ROM code. This option ROM code is then used to as part of the system BIOS, in accordance with the present invention. In the case of a DOS OS, some of the option ROM code will become a permanent part of the OS because the DOS OS does not have drivers which replace the option ROM code for I/O functionality. In the case of a Windows (NT or 2000) OS, the option ROM code for the interface adapter 44 is used only during the boot process because the last phases of the boot process of the Windows OS result in replacing the interrupt 13 service code with Windows-specific driver code which accomplishes the I/O functionality. The option ROM code identifies it as having interrupt 13 service functionality.

Next as shown at step 82, the initialization code 62 which has been read from the option ROM memory is invoked and run. The initialization code 62 is executed from its location recorded in the system RAM 26. The initialization code 62 is responsible for initializing the functionality of the interface adapter 44. Running the initialization code also sets up any "hooks" or other data structures necessary for communicating signals between the system BIOS and the interface adapter 44.

Thereafter, as shown at step 84, the interface adapter 44 is initialized and made functional as a result of running the initialization code 62 of the option ROM memory at step 82.

The adapter bus 46 is thereafter scanned, as shown at step 86, and the physical and logical devices connected to the adapter bus 46 are located and identified. All of the RAID disk drives 30, 32, 34 and 36 which participate in the RAID volume 48 are identified as one logical device. The queries performed at step 86 allow the RAID volume formed by the disk drives 30, 32, 34 and 36 to be presented to the system BIOS as if they were a single physical device. The queries at step 86 also determine which storage devices are not part of a RAID system but are some other logical device. These non-RAID devices are presented to and recognized by the system BIOS as individual devices.

The steps 74, 76, 78, 80, 82, 84 and 86 of the process flow 72 shown in FIG. 5 are well-known and conventional. The new and improved aspects of the present invention begin at step 88 and involve certain subsequent steps in the process flow 72.

As part of identifying the RAID devices at step 86, several I/Os are communicated to the storage devices 30, 32, 34, and 36, as shown at step 88. These I/Os cause the storage devices to respond with information that identifies them as part of the RAID volume 48. The responses to these I/Os are returned to the system RAM 26 where they are processed to assure the RAID volume 48 is valid and functional.

At step 90, the validation of the RAID volume at step 88 confirms that the RAID volume 48 is capable of booting the OS from it. Some portion of the sectors and stripes available on each disk drive 30, 32, 34 and 36 of the RAID volume 48 contain the bootable OS code. Preferably the OS is spread somewhat evenly across all of the disks which make up a RAID 1 or 10 volume. In the case of RAID 1, where each individual device is mirrored and there is no striping, the OS would be located on each of the mirrored disks.

Next as shown at step 92, the RAID I/O algorithmic instructions 70 of the option ROM memory creates a single "handle" for those devices which constitute the RAID volume 48. The handle for a RAID volume is typically all of the data structures within the system RAM 26 necessary to describe and interact with the RAID volume 48. The other non-RAID devices are given their own handles. These handles are available for use by the interrupt 13 service. Those storage devices (i.e., disks 30, 32, 34 and 36) which are part of the RAID system are hidden so that they cannot be recognized individually by the system BIOS, but instead can be recognized only in conjunction with the handle assigned to the RAID volume 48.

The initialization phase of the boot process 72 is terminated, and the initialization code 62 of the option ROM memory is deleted from the system RAM 26 as shown at conventional step 94. With respect to the full option ROM code 51 which was initially read from the option ROM memory 50, only the run-time code 64 and the data structures remain resident in the system RAM 26, although other code may also be present in the system RAM 26. These data structures have the information which identifies the devices which are part of the RAID volume and information which describes the configuration of those devices. This information is stored in system RAM as part of the run-time information.

Next, as shown at step 96, the system BIOS enters the boot phase of its operation and issues a conventional interrupt 19 service call which then calls the conventional interrupt 13 service. As a result, the process flow 72 moves on to the conventional run-time phase of the boot process as shown at step 98. In conjunction with step 98, the run-time code 64 of the option ROM memory is executed from the system RAM 26.

The conventional interrupt 13 service is then invoked to commence booting the RAID volume 48, as shown at step 100. The interrupt 13 service executes without any knowledge of the existence of the RAID volume 48. As far as the system BIOS is concerned, it believes that it is booting a conventional single physical disk or single storage media. The existence of the RAID volume 48 is hidden, because the RAID I/O algorithmic instructions have been embedded in the option ROM memory which is executed by the interrupt 13 service.

Next, the interrupt 13 service invokes the RAID algorithm code 70 which causes RAID processing, as shown at step 102. The RAID structures in the system RAM 26 are accessed to describe the RAID volume and to perform the processing for handling I/Os from the system BIOS. The RAID processing available from the RAID I/O algorithmic instructions determines how the I/Os should be split up and distributed to those devices which form the RAID logical device and RAID volume.

The I/Os are delivered to the disk drives 30, 32, 34 and 36 of the RAID volume 48, as shown at step 104. The OS code, which is distributed on the disk drives, is read and delivered to the system RAM 26 in a conventional manner, as shown at step 106. This process is repeated until all of the code defining the OS has been communicated to the system RAM 26. At the conclusion of step 106, the system OS code is resident in the system RAM 26 and is available to be used for the further operation of the computer system.

In some OSs, the interrupt 13 service code at step 100 is replaced or superseded by other drivers, and the other driver takes over the I/O services during the remainder of the boot process. These other drivers take over from the interrupt 13 service when enough of the OS has booted to load the replacement drivers and make them functional. At that time, the system BIOS interrupt 13 service are no longer needed because the replacement drivers take over accessing the RAID volume and loading the additional code. The replacement I/O drivers obtain information about the RAID volume which has previously been recorded in the system RAM 46, in order to take over control of the I/Os. In the case of Windows (NT or 2000), the replacement of the interrupt 13 service with other I/O drivers occurs fairly early in the boot process. In Windows, a miniport driver assumes responsibility for interaction with and control over the hardware aspects of the interface adapter 44. The drivers may also remain in place to perform the I/Os during normal system operation.

In the case of DOS or DOS-like OSs, there are usually no replacement I/O drivers to take over for the interrupt 13 service. Instead, the interrupt 13 service remain functional during use of the computer system after the boot phase has been completed in order to perform routine I/Os.

As is apparent from the previous description, the present invention makes it possible to boot a computer system OS using a RAID volume as the primary OS storage media and gives the system OS the capability of communicating I/Os directly with the RAID volume. Moreover, by utilizing RAID I/O algorithmic instructions in the option ROM memory of a conventional interface adapter during booting, a conventional interface adapter can perform the functions of a RAID controller, while still providing the conventional functionality to interact with other non-RAID storage devices connected to it on the adapter bus. Consequently, the need for complex RAID controllers is avoided, resulting in a less costly but equally effective high-performance computer system. The technique of embedding sufficient RAID I/O algorithmic instructions, device control instructions and interrupt 13 service code into an option ROM memory of an interface adapter allows the OS to be booted directly from RAID media and allows the OS to communicate I/Os directly to the RAID volumes. The standard device detect capability of the system BIOS to scan the devices connected to the system bus of the computer system allows the code of the option ROM memory to be invoked and executed to load the OS and allows the OS to become directly interactive with the RAID volume. Added protection is available against the accidental loss or destruction of the OS code, because the OS may be recorded in the RAID volume. A RAID volume provides added protection against accidental data loss and destruction. Many other advantages and improvements will be apparent after comprehending the ramifications of the present invention.

A presently preferred embodiment of the invention and its improvements have been described with a degree of particularity. This description has been made by way of preferred example. It should be understood that the scope of the present invention is defined by the following claims, and the claims should not be unnecessarily limited by the detailed description of the preferred embodiment set forth above.

The invention claimed is:

1. A method of booting an operating system (OS) recorded in a redundant array of independent disks (RAID) storage media in a computer system having a processor, a nonvolatile system memory and an interface adapter connected to a bus, the interface adapter including a nonvolatile option ROM memory, the interface adapter connected to the RAID storage media, the nonvolatile system memory storing basic input output system (BIOS) instructions including a BIOS hardware detect instruction set and a BIOS input output (I/O) instruction set, the method comprising the steps of:

recording RAID I/O algorithmic instructions in the option ROM memory;

executing the BIOS hardware detect instruction set to read the RAID I/O algorithmic instructions recorded in the option ROM memory; and executing the BIOS I/O instruction set utilizing the RAID I/O algorithmic instructions read from the option ROM memory to read the OS from the RAID storage media.

2. A method as defined in claim 1 further comprising the steps of:

recording the RAID I/O algorithmic instructions in the system memory after reading the RAID I/O algorithmic instructions from the option ROM memory; and using the RAID I/O algorithmic instructions from the system memory in executing the BIOS I/O instructions.

3. A method as defined in claim 1 further comprising the step of:

using the RAID storage media as the primary OS storage media after booting the OS.

4. A method as defined in claim 3 further comprising the step of:

using the RAID I/O algorithmic instructions in executing primary OS I/O operations after booting the OS.

5. A method as defined in claim 3 further comprising the steps of:

recording replacement RAID driver I/O algorithmic instructions in the RAID storage media;

replacing the RAID I/O algorithmic instructions with the replacement RAID driver I/O algorithmic instructions read from the RAID storage media after booting the OS; and utilizing the replacement RAID driver I/O algorithmic instructions in executing OS I/O operations.

6. A method as defined in claim 5 further comprising the steps of:

including RAID error handling instructions in the replacement RAID driver I/O algorithmic instructions; and utilizing the RAID error handling instructions obtained from the replacement RAID driver I/O algorithmic instructions in executing OS I/O operations.

7. A method as defined in claim 1 further comprising the steps of:

forming the RAID storage media from a plurality of independent storage devices connected to the interface adapter;

connecting at least one other storage device to the interface adapter;

communicating I/O operations through the interface adapter to the RAID storage media; and communicating I/O operations through the interface adapter to the other storage device.

8. A method as defined in claim 1 further comprising the steps of:

recording RAID error handling instructions in the RAID storage media;

reading the RAID error handling instructions from the RAID storage media after booting the OS; and utilizing the RAID error handling instructions obtained from the RAID storage media in executing OS I/O operations after booting the OS.

9. A method as defined in claim 1 further comprising the steps of:

forming the RAID storage media from a plurality of independent storage devices connected to the interface adapter;

logically configuring two of the storage devices in a RAID 1 configuration wherein one of the two storage devices is recorded with a duplicate of the information recorded in the other one of the two storage devices; and recording the OS on both of the two storage devices in the RAID 1 configuration.

10. A method as defined in claim 1 further comprising the steps of:

forming the RAID storage media from a plurality of independent storage devices connected to the interface adapter;

logically configuring the plurality of storage devices in a RAID 0 configuration with at least one stripe for containing data; and recording the OS in at least one stripe of the storage devices in the RAID 0 configuration.

11. A method as defined in claim 1 further comprising the steps of:

forming the RAID storage media from a plurality of independent storage devices connected to the interface adapter;

logically configuring the plurality of storage devices in a RAID 10 configuration wherein a first group of the storage devices are recorded with a duplicate of the information recorded in a second group of storage devices, and wherein each of the first and second groups of storage devices are recorded with stripes for containing data;

recording the OS in at least one stripe in the first group of storage devices; and recording a duplicate copy of the OS in at least one stripe of the second group of storage devices.

12. A method as defined in claim 1 further comprising the step of:

recording in the option ROM memory, in addition to the RAID I/O algorithmic instructions, BIOS I/O instruction service code which allows the BIOS I/O instruction set to use the RAID I/O algorithmic instructions.

13. A method as defined in claim 12 further comprising the step of:

recording in the option ROM memory, device control instructions which allow the RAID I/O algorithmic instructions to interact with the interface adapter to perform I/O operations to the RAID storage media.

14. A method as defined in claim 13 further comprising the step of:

forming the RAID storage media from a plurality of independent storage devices connected to the interface adapter;

recording in the option ROM memory, initialization code which initializes the interface adapter when executed and which validates an operative status of the storage devices;

recording the initialization code in the system memory after reading the initialization code from the option ROM memory;

executing the initialization code from the system memory to initialize the interface adapter and to validate the operative status of the storage devices; and deleting the initialization code from the system memory after the interface adapter has been initialized and the operative status of the storage devices has been validated.

15. A method of directly establishing and executing operating system (OS) input/output (I/O) instructions with a redundant array of independent disks (RAID) storage media in an OS of a computer system which also includes a nonvolatile memory and a basic input output system (BIOS) recorded in the nonvolatile memory, comprising the steps of:

recording in the nonvolatile memory, RAID I/O algorithmic instructions for use by the OS in performing OS I/O operations on the RAID storage media;

reading the RAID I/O algorithmic instructions from the nonvolatile memory when booting the OS while executing the BIOS during booting; and using the RAID I/O algorithmic instructions to execute OS I/O operations after the OS has booted.

16. A method as defined in claim 15 further comprising the steps of:

recording replacement RAID driver I/O algorithmic instructions in the RAID storage media;

replacing the RAID I/O algorithmic instructions with the replacement RAID driver I/O algorithmic instructions after booting the OS; and utilizing the replacement RAID driver I/O algorithmic instructions in executing OS I/O operations.

17. A method as defined in claim 16 further comprising the steps of:

recording the OS in the RAID storage media; and reading the OS from the RAID storage media using the RAID I/O algorithmic instructions in I/O operations originated by the BIOS during booting of the OS.

18. A method as defined in claim 17 further comprising the step of:

forming the RAID storage media from a plurality of independent storage devices; and recording the OS in at least one stripe across multiple storage devices of the RAID storage media.

19. A method as defined in claim 17 further comprising the step of:

forming the RAID storage media from a plurality of independent storage devices; and recording a redundant copy of the OS on each of two storage devices of the RAID storage media.

20. A method as defined in claim 17 further comprising the step of:

forming the RAID storage media from a plurality of independent storage devices;

recording a first copy of the OS in at least one stripe across a first group of multiple storage devices of the RAID storage media; and recording a second copy of the OS in at least one stripe across a second different group of multiple storage devices of the RAID storage media, the first and second copies of the OS being identical.

21. A computer system having a processor and a system memory connected by a system bus, the system memory including a nonvolatile system memory which includes code that defines a basic input output system (BIOS), the system BIOS including a BIOS hardware detection instruction set and a BIOS input output (I/O) instruction set, an interface adapter also connected to the system bus and which includes a nonvolatile option ROM memory, and a plurality of independent storage devices organized into a redundant array of independent disks (RAID) storage media which is connected to the interface adapter, and improvements in combination therewith wherein:

the RAID storage media has the OS recorded therein in a RAID configuration on a plurality of at least some of the independent storage devices; and the option ROM memory has RAID I/O algorithmic instructions recorded therein which cause the BIOS hardware detect instruction set to read the RAID I/O algorithmic instructions from the option ROM memory and record the RAID I/O algorithmic instructions in the system memory during booting of the OS; and the RAID I/O algorithmic instructions execute in conjunction with the BIOS I/O instruction set to read the OS recorded on the RAID storage media during booting of the OS.

22. A computer system as defined in claim 21 wherein:

the RAID I/O algorithmic instructions are used in executing primary OS I/O operations after booting the OS.

23. A computer system as defined in claim 21 wherein:

the RAID storage media has recorded thereon replacement RAID driver I/O algorithmic instructions; and the RAID I/O algorithmic instructions are superceded by the replacement RAID driver I/O algorithmic instructions which are read from the RAID storage media after booting the OS.

24. A computer system as defined in claim 23 wherein:

RAID error handling instructions constitute a part the replacement RAID driver I/O algorithmic instructions; and the RAID error handling instructions are executed in conjunction with OS I/O operations performed by the superseding RAID driver I/O algorithmic instructions.

25. A computer system as defined in claim 21 wherein:

two of the storage devices are logically configured in a RAID 1 configuration wherein one of the two storage devices is recorded with a duplicate of the information recorded in the other one of the two storage devices; and the OS is recorded as a duplicate copy on both of the two storage devices in the RAID 1 configuration.

26. A computer system as defined in claim 21 wherein:

the plurality of storage devices is configured in a RAID 0 configuration with at least one stripe for containing data; and the OS is recorded in at least one stripe of the storage devices in the RAID 0 configuration.

27. A computer system as defined in claim 21 wherein:

the plurality of storage devices is configured in a RAID 10 configuration wherein a first group of the storage devices is recorded with a duplicate of the information recorded in a second group of storage devices, and wherein each of the first and second-groups of storage devices are recorded with stripes for containing data;

the OS is recorded in at least one stripe in the first group of storage devices; and a duplicate copy of the OS is recorded in at least one stripe of the second group of storage devices.

28. A computer system as defined in claim 21 wherein:

the option ROM memory has recorded therein, in addition to the RAID I/O algorithmic instructions, BIOS I/O instruction service code which allows the BIOS I/O instruction set to use the RAID I/O algorithmic instructions.

29. A computer system as defined in claim 28 wherein:

the option ROM memory also has recorded therein hardware control instructions which allow the RAID I/O algorithmic instructions to interact with the interface adapter to perform I/O operations to the RAID storage media.

30. A computer system as defined in claim 29 wherein:

the option ROM memory also has recorded therein initialization code which is read from the option ROM memory into the system memory, which initializes the interface adapter when executed, which validates an operative status of the storage devices, and which is deleted the system memory after the interface adapter has been initialized and the operative status of the storage devices has been validated.

* * * * *